United States Patent Office 3,328,212
Patented June 27, 1967

3,328,212
SUBMERGED-ARC WELDING COMPOSITION
Thomas L. Coless, Maplewood, N.J., assignor to Union Carbide Corporation, a corporation of New York
No Drawing. Filed June 29, 1965, Ser. No. 468,114
14 Claims. (Cl. 148—26)

This invention relates to submerged-arc welding. More particularly, this invention relates to an improved submerged-arc welding composition operable in both alternating and direct current welding which produces a weld characterized by high impact strength over a broad range of temperatures.

Submerged-arc or melt welding utilizes granular flux material and bare wire electrodes. Typically, a wire electrode is connected in electric circuit with a workpiece. The heat generated by the electric-arc continuously consumes the wire electrode as welding progresses along the workpiece. The granular flux material or submerged-arc welding composition is continuously added to a welding zone and is fused by the heat generated by the electric arc within such zone; the flux then accumulates in the fused state over the weld metal thereby protecting the weld from the deleterious effects of the surrounding atmosphere.

One of the problems with many of the present day submerged-arc welding compositions is the production of high quality welds, especially welds having high impact strength while at the same time maintaining good weldability. Moreover, conventional submerged-arc welding compositions of the bonded type having a base of calcium oxide tend to absorb moisture from the atmosphere thereby imparting hydrogen embrittlement to the weld metal, which results in low impact strengths for the as-welded product.

Furthermore, alloying agents are often added to the weld metal by integrating the desired alloys into the bonded welding compositions. Unfortunately, the weld chemistry produced with these additives is a function of welding conditions. Fluctuations in voltage, for example, can produce a weld chemistry sufficiently altered from the ideal that the physical properties of the resultant weld metal are adversely affected.

In addition, when high welding currents are used with bonded and bonded alloy welding fluxes the weld metal is often not satisfactory. These fluxes seem to degrade under high current conditions and fail to provide the proper protective coating or shielding slag for the weld metal.

An additional problem encountered in the welding industry is the low impact strength of weld metals at relatively low temperatures. Many of the bonded welding as well as fused submerged-arc welding compositions generally heretofore available produce low impact strength welds at room to below zero temperature conditions. Such weldments as pressure vessels, bridges, and heavy structures which are subjected to harsh temperature environments are, therefore, suspect when welded with these welding fluxes.

The granular submerged-arc welding composition described in U.S. Patent 3,100,829 to Kubli et al. (issued Aug. 13, 1963) has proven highly satisfactory in overcoming the aforementioned problems. The composition is particularly valuable in producing high impact strength welds over a broad temperature spectrum, especially in direct current welding. However, when the patentees' composition is used in alternating current welding, the weld metal often gives rise to pinhole porosity which tends to weaken the weld metal. An additional problem in alternating current welding with the patentees' welding flux is in voltage fluctuation. The peak voltage across the electric-arc often approaches open circuit values resulting in reduced weldability.

It is, therefore, the primary object of this invention to provide a granular submerged-arc welding composition which is operable with alternating as well as direct current welding and which produces welds characterized by high impact strengths over a broad range of temperatures.

Another object of this invention is to provide a granular submerged-arc welding composition operable in both direct and alternating current welding which yields a weld chemistry independent of variations in welding conditions, especially voltage fluctuations.

It is yet another object of this invention to provide a granular submerged-arc welding composition suitable for both alternating and direct current welding which yields high impact strength welds over a broad temperature range and which is suitable for use when alloying of the weld metal is desired.

It is still another object of the present invention to provide a granular submerged-arc welding composition operable in both direct and alternating current welding which can be satisfactorily employed with high welding currents.

It is still a further object of this invention to provide a granular submerged-arc welding composition which yields a weld free of pinhole porosity and which effects a minimization of voltage fluctuation in alternating current welding.

These and other objects, advantages and features of this invention will become more apparent from the following description and appended claims.

According to the present invention, there is provided a granular submerged-arc welding composition operable in both direct and alternating current welding which comprises the following weight percent ingredients:

from about 30 to about 55 percent CaO;
from about 27 to about 45 percent $SiO_2$;
from about 2 to about 6 percent MnO;
from about 4 to about 15 percent fluoride;
a trace to about 10 percent $TiO_2$;
a trace to about 1 percent FeO;
a trace to about 1 percent MgO;
a trace to about 2 percent $Al_2O_3$;
a trace to about 0.5 percent $Na_2O$;
and from about 1 to about 10 percent of at least one carbonate selected from the class of carbonates formed from the elements consisting of: potassium, sodium, lithium, magnesium, iron and calcium with a total of about 2.5 percent of such carbonates being preferred.

The preferred granular submerged-arc welding composition of this invention which is operable in both direct and alternating current welding comprises the following weight percent ingredients:

from about 39 to about 44 weight percent CaO;
from about 37 to about 41 percent $SiO_2$;
about 4 percent MnO;
about 8 percent cryolite;
a trace to about 1 percent $TiO_2$;
a trace to about 1 percent FeO;
a trace to about 1 percent MgO;
a trace to about 2 percent $Al_2O_3$;
a trace to about 0.5 percent $Na_2O$;
and from about 1 to about 10 percent of at least one carbonate selected from the class of carbonates formed from the elements consisting of: potassium, sodium, lithium, magnesium, iron and calcium with a total of about 2.5 percent of such carbonates being preferred.

The inventive composition may be viewed as comprising the granular submerged-arc welding composition described in the Kubli et al. patent mentioned above and the carbonate. The Kubli composition, often referred to here as the "starting ingredients," is normally prepared by fusing its ingredients in an electric-arc furnace. After the starting ingredients are fused, they are ground to size. A sizing of through 20 with no bottom sizing with standard Tyler screens has been found satisfactory. After the sizing step, the carbonate is added. In order to be effective, the carbonate must be present as such in the submerged-arc welding composition when it is used as a welding flux. It is necessary, therefore, to add the carbonate to the starting ingredients after the latter have been fused.

The carbonate is mechanically mixed with the starting ingredients after they are fused and ground. The carbonate must be freely and homogeneously mixed within the starting ingredients in order to present a uniform granular submerged-arc welding composition to the electric-arc and weld metal at any point in time during the welding process. For this purpose, the carbonate must be sized such that it will not sift out or segregate from the starting ingredients. While considerable latitude is possible isasmuch as the bulk densities of the carbonate and the starting ingredients are roughly equivalent, a carbonate sizing, the same as the sizing of the starting ingredients, is very effective. For example, when the starting ingredients are sized with standard Tyler screens at through 12 on 100, the following carbonate sizing for $CaCO_3$ has proven effective:

6 weight percent $CaCO_3$ on 12 mesh
80 weight percent $CaCO_3$ on 48 mesh.
1½ weight percent $CaCO_3$ through 150 mesh.

The weight percentages immediately above are based on the total amount of $CaCO_3$ sized and the screen size is expressed in mesh from the standard Tyler screen series. Inasmuch as the carbonates, previously enumerated, which form a part of the inventive composition are all of roughly the same bulk density, similar sizings for the other carbonates will prove effective.

The minimum amount of carbonate in the granular submerged-arc welding composition is about one weight percent of the total starting ingredients. This is the minimum addition which renders the welding composition effective especially when the elimination of weld metal porosity occurring with alternating current welding is desired. While the effectiveness of the added carbonate in suppressing pinhole porosity is effective when added in amounts exceeding 10 weight percent of the total ingredients, porosity is eliminated with the addition of lesser amounts. If more than 10 percent is added, depressions on the surface of the weld metal are likely to occur in undesirable amounts. Such depressions do not affect the physical properties of the weld metal, but are unsightly. Moreover, the effectiveness of the other ingredients in promoting weldability and desirable weld metal properties such as bead shape is reduced by excessive dilution of the starting ingredients. However, carbonate addition in excess of 10 weight percent may be used without affecting the physical properties of the weld metal. It has been found that about 2.5 weight percent carbonate addition admirably effectuates the objects of this invention and for most applications optimizes the consideration discussed above.

As previously stated, the basic starting ingredients of the inventive granular submerged-arc welding composition are the same as disclosed in the aforementioned U.S. Patent 3,100,829 to Kubli et al. The considerations used in arriving at the Kubli composition will therefore be discussed here.

The Kubli composition is primarily made up from calcium oxide (CaO) and silicon dioxide ($SiO_2$). The impact properties of the weld metal increases as the ratio of CaO to $SiO_2$ increases from 0.8 to 1.8. Desirable impact resistance and good weldability are demonstrated within a CaO to $SiO_2$ ratio range of from about 0.93 to about 1.4 with certain other additions to the Kubli et al. composition. When the CaO to $SiO_2$ ratio is increased beyond this range, enhanced impact strength results with a diminution in weldability. When the CaO to $SiO_2$ ratio falls below 0.93 the impact strength of the weld metal is reduced without a compensating increase in weldability; that is, when considering both impact strength and weldability there appears to be a net loss of effectiveness when the CaO to $SiO_2$ ratio falls below about 0.93. In terms of weight percentage of the total starting ingredients, the amounts of CaO and $SiO_2$ should be 33 to 55 and 30 to 45 percent respectively.

In contrast to the Kubli et al. composition where an excess ratio of CaO to $SiO_2$ results in decreased weldability, the use of $CaCO_3$ in the composition of this invention increases impact strength without adversely affecting weldability. The reason for this appears to be that the $CaCO_3$ breaks down from the action of the heat from the electric-arc to form carbon dioxide and CaO. The carbon dioxide promotes weldability while the CaO enhances impact strength.

When operating with alternating current, the use of the carbonates as a part of the subject inventive composition eliminates the problem of erratic voltage fluctuations experienced when welding with the Kubli et al. composition; where, as previously mentioned, the absolute peak voltage often approached open circuit values. It is postulated that the $CO_2$ gas formed by the decomposition of the carbonate from the heat of the electric-arc ionizes in and stabilizes the electric-arc. This ionized gas allows the re-establishment of the electric-arc in an orderly manner just after alternating voltage potential traces its well known sine wave path through zero.

A fluoride, for example calcium fluoride ($CaF_2$) or cryolite ($Na_3AlF_6$), is employed as an ingredient in the inventive composition to enhance weldability by improving the fluidity and electrical conductivity of the flux. Cryolite ($Na_3AlF_6$) is the preferred fluoride. It has been found that cryolite improves impact strength over calcium fluoride especially at low temperatures. The amount of cryolite added should be within the range of 4 to 15 percent by weight of the total starting ingredients. Above the upper limit weldability is adversely affected; while below 4 weight percent the impact strength of the weld metal is not affected.

Manganese oxide (MnO) is an ingredient in the inventive composition and serves to improve weldability by reducing pocking and porosity in the weld metal. Favorable welding characteristics are obtained with MnO contents in the inventive composition of from about 2 to about 6 weight percent with 4 percent preferred.

Room temperature impact properties of the weld metal are improved without affecting low temperature impact strengths with the addition of titanium oxide in the amounts of up to 10 weight percent of the total starting ingredients of the inventive composition. In excess of 10 percent the low temperature impact properties of the weld metal are reduced. However, compositions essentially free of titanium oxide are less costly and have excellent impact properties at room and lower temperatures.

In order to achieve a proper balance of ingredients which will yield good weldability and weld metal characteristics, the oxides of magnesium (MgO), aluminum ($Al_2O_3$), and sodium ($Na_2O$) should be controlled such that their maximum weight percentages in the starting ingredients do not exceed 1, 2 and 0.5 percent respectively. The addition of iron oxide (FeO) in excess of 1 weight percent of the starting ingredients appears to be deleterious and should therefore be limited to this amount. In any event, the aggregate of all of the abovementioned oxides should not exceed 5 weight percent of the total weight of the submerged-arc welding composition of this invention. While the above enumerated percentages are preferred, it is to be understood that compositions containing oxides outside these limits are still within the spirit and scope of this invention.

While it is preferred to add alloying agents by means of the bare electrode, in certain instances it may be desired to add materials to the starting ingredients in order to alter the physical properties of the weld metal. The oxides of chromium and molybdenum can be added by fusion to the such ingredients in order to increase tensile strength. However, such additions should be limited to no more than 5 and 10 weight percent of the total starting ingredients respectively for molybdenum oxide and chromium oxide. Similarly, metals, for example, powdered nickel may be added by bonding to the starting ingredients with a suitable bonding agents, for example, sodium silicate, to afford improved properties.

The table which follows compares physical properties of weld metals produced with the use of both the preferred granular submerged-arc welding composition of this invention, denoted as Flux B, and the preferred Kubli et al. composition denoted as Flux A. Direct current reverse polarity current was used in conjunction with Flux A, while alternating current was used with Flux B. About 2.5 weight percent $CaCO_3$ was used as the carbonate in Flux B, in all other respects the fluxes were the same. The bare electrodes, which ultimately were integrated into the weld metal, were comprised of the following weight percent ingredients:

| Element: | Approximate percent of total ingredients |
|---|---|
| Carbon | <0.045 |
| Phosphorus | <0.006 |
| Manganese | 1.25 to 2.00 |
| Sulphur | <0.010 |
| Silicon | <0.030 |
| Chromium | 0.20 to 1.0 |
| Nickel | 1.40 to 3.50 |
| Molybdenum | 0.10 to 1.00 |
| Titanium | 0.01 to 0.08 |
| Zirconium | 0.01 to 0.08 |
| Aluminum | 0.01 to 0.8 |
| Iron | Balance |

The workpieces were two inch thick steel plates having the following weight percent ingredients:

| Element: | Weight percent of total ingredients |
|---|---|
| Carbon | 0.18 |
| Manganese | 0.10 to 0.40 |
| Chromium | 1.00 to 1.80 |
| Nickel | 2.00 to 3.25 |
| Molybdenum | 0.20 to 0.60 |
| Silicon | 0.15 to 0.35 |
| Phosphorus | Up to 0.025 |
| Sulphur | Up to 0.025 |
| Iron | Balance |

This steel has a yield strength of 80,000 p.s.i. The impact strength of the weld metal was determined by the standard Charpy V notch impact test. This test determines the ability of a material to withstand a sudden force of unusual intensity without failure. All the samples tested were taken from the weld metal.

TABLE

| Parameter | Flux A | Flux B |
|---|---|---|
| Electrode welding rod diameter | 5/32 inch | 5/32 inch. |
| Welding current | Direct | Alternating. |
| Ultimate tensile strength (p.s.i. range) (X's 1,000) | 115 to 118.3 | 114 to 121.6. |
| Yield strength (p.s.i. range) (X's 1,000) | 108.4 | 102.8 to 111.0. |
| Percent elongation | 18.9 | 19.9. |
| Percent reduction in area | 58.8 | 64.0. |
| Charpy "V" (ft./lbs.): | | |
| Room temperature | 52 to 63 | 68 to 73. |
| −80° Fahrenheit | 38 to 40 | 39 to 54. |
| −100° Fahrenheit | 31 to 35 | 24 to 44. |

The above table shows that the physical properties of the weld metal produced by the inventive submerged melt welding composition were comparable to and in some instances exceeded the properties of the weld metal produced by the Kubli et at. composition. The weld metal produced by the inventive composition (Flux B) deposited with alternating current was substantially free of pinhole porosity; whereas it has been found that weld metals produced with alternating current and the Kubli et al. composition had sufficient pinhole porosity to adversely affect its physical properties.

It should be understood that the scope and spirit of the appended claims encompass not only submerged arc electric arc welding utilizing both direct and alternating current, but any other welding operation utilizing granular welding fluxes, for example, series welding.

What is claimed is:

1. A granular submerged-arc welding composition for use in both direct and alternating current submerged-arc welding consisting essentially of
    from about 30 to about 55 percent CaO;
    from about 27 to about 45 percent $SiO_2$;
    from about 2 to about 6 percent MnO;
    from about 4 to about 15 percent fluoride;
    a trace to about 10 percent $TiO_2$;
    and from about 1 to about 10 percent of at least one carbonate selected from the class of carbonates formed from the elements consisting of: patassium, sodium, lithium, magnesium, iron and calcium;
    wherein the percentages refer to weight percent of the total weight of the granular welding composition.

2. A granular welding composition as claimed in claim 1 wherein the carbonate is $CaCO_3$.

3. A granular welding composition as claimed in claim 1 wherein the weight percentage of the carbonate is about 2.5 percent.

4. A granular welding composition as claimed in claim 3 wherein the carbonate is $CaCO_3$.

5. A granular welding composition as claimed in claim 1 having oxide impurities selected from the class consisting of FeO, MgO, $Al_2O_3$ and $Na_2O$, the total amount of the oxide impurities not exceeding 5 weight percent of the total weight of the granular submerged-arc welding composition.

6. A granular welding composition as claimed in claim 5 wherein the carbonate is $CaCO_3$.

7. A granular welding composition as claimed in claim 6 wherein the weight percentage of the $CaCO_3$ is about 2.5 percent.

8. A granular submerged-arc welding composition for use in both direct and alternating current submerged-arc welding consisting essentially of:
    from about 39 to about 44 percent CaO;
    from about 37 to about 41 percent $SiO_2$;
    about 4 percent MnO;
    about 8 percent cryolite;
    a trace to about 1 percent $TiO_2$;

and from about 1 to about 10 percent of at least one carbonate selected from the class of carbonates formed from the elements consisting of: potassium, sodium, lithium, magnesium, iron and calcium;

wherein the percentages refer to weight percent of the total weight of the granular welding composition.

9. A granular welding composition as claimed in claim 8 wherein the carbonate is $CaCO_3$.

10. A granular welding composition as claimed in claim 8 wherein the weight percentage of the carbonate is about 2.5 percent.

11. A granular welding composition as claimed in claim 10 wherein the carbonate is $CaCO_3$.

12. A granular welding composition as claimed in claim 8 having oxide impurities selected from the class consisting of FeO, MgO, $Al_2O_3$ and $Na_2O$, the total amount of the oxide impurities not exceeding 5 weight percent of the weight of the granular submerged-arc welding composition.

13. A granular welding composition as claimed in claim 12 wherein the carbonate is $CaCO_3$.

14. A granular welding composition as claimed in claim 13 wherein the weight percentage of the $CaCO_3$ is about 2.5 percent.

No references cited.

DAVID L. RECK, *Primary Examiner.*

H. F. SAITO, *Assistant Examiner.*